United States Patent
Emigh et al.

(10) Patent No.: US 8,423,471 B1
(45) Date of Patent: Apr. 16, 2013

(54) PROTECTED DOCUMENT ELEMENTS

(75) Inventors: Aaron T. Emigh, Incline Village, NV (US); James A. Roskind, Redwood City, CA (US)

(73) Assignee: Radix Holdings, LLC, Incline Village, NV (US)

( * ) Notice: Subject to any disclaimer, the term of this patent is extended or adjusted under 35 U.S.C. 154(b) by 2670 days.

(21) Appl. No.: 11/016,150

(22) Filed: Dec. 17, 2004

Related U.S. Application Data

(60) Provisional application No. 60/542,211, filed on Feb. 4, 2004, provisional application No. 60/566,671, filed on Apr. 29, 2004, provisional application No. 60/612,132, filed on Sep. 22, 2004.

(51) Int. Cl.
*G06F 21/00* (2006.01)
*H04L 9/32* (2006.01)

(52) U.S. Cl.
USPC .............. 705/51; 705/50; 713/176; 713/178; 726/22

(58) Field of Classification Search ........... 705/1, 50–59
See application file for complete search history.

(56) References Cited

U.S. PATENT DOCUMENTS

| | | | |
|---|---|---|---|
| 6,065,021 A * | 5/2000 | George ..................... | 715/245 |
| 6,092,194 A * | 7/2000 | Touboul .................... | 726/24 |
| 6,421,709 B1 * | 7/2002 | McCormick et al. ......... | 709/206 |
| 6,697,950 B1 * | 2/2004 | Ko ........................... | 726/24 |
| 6,792,536 B1 * | 9/2004 | Teppler ..................... | 713/178 |
| 6,910,077 B2 * | 6/2005 | Najork ...................... | 709/229 |
| 7,100,049 B2 * | 8/2006 | Gasparini et al. ........... | 713/170 |
| 7,114,147 B2 * | 9/2006 | Ballantyne et al. .......... | 717/107 |
| 2002/0112008 A1 * | 8/2002 | Christenson et al. ......... | 709/206 |
| 2004/0078422 A1 * | 4/2004 | Toomey ..................... | 709/202 |
| 2004/0088433 A1 * | 5/2004 | Kaler et al. ................. | 709/246 |
| 2004/0111673 A1 * | 6/2004 | Bowman et al. ............. | 715/513 |
| 2005/0044242 A1 * | 2/2005 | Stevens et al. .............. | 709/228 |
| 2005/0154601 A1 * | 7/2005 | Halpern et al. .............. | 705/1 |
| 2007/0101423 A1 * | 5/2007 | Oliver et al. ................ | 726/22 |

* cited by examiner

*Primary Examiner* — Calvin L Hewitt, II
*Assistant Examiner* — C. Aaron McIntyre

(57) ABSTRACT

In some embodiments, techniques for computer security comprise displaying an electronic document, detecting a request to traverse a link, such as a hyperlink or a form submission, wherein the link is associated with an element of the document, evaluating an attribute, wherein the attribute is associated with the element of the document, and determining whether to perform the action based on the evaluation. Applications of these techniques include mitigating the effect of an attempt to modify web pages for fraudulent purposes, such as by a "phishing" attack incorporating malicious scripting.

19 Claims, 7 Drawing Sheets

PROTECTED DOCUMENT ELEMENTS

CROSS REFERENCE TO OTHER APPLICATIONS

This application claims priority to U.S. Provisional Patent Application No. 60/542,211 entitled Anti-Phishing Measures and URL Salience, filed Feb. 4, 2004, which is incorporated herein by reference for all purposes.

This application claims priority to U.S. Provisional Patent Application No. 60/566,671 entitled Phishing Countermeasures, filed Apr. 29, 2004, which is incorporated herein by reference for all purposes.

This application claims priority to U.S. Provisional Patent Application No. 60/612,132 entitled Anti-Phishing Technology, filed Sep. 22, 2004, which is incorporated herein by reference for all purposes.

FIELD OF THE INVENTION

The present invention relates generally to the area of computer security. More specifically, techniques for protecting elements of a document are disclosed.

BACKGROUND OF THE INVENTION

Electronic documents such as web sites and email are used for a wide variety of purposes. The integrity of electronic documents is not assured, and document elements may be modified in a deceptive or malicious manner. Modified document elements have been used to illicitly run scripts and defraud users. Current email and web browser technology does not provide adequate defenses against the manipulation of document elements.

Accordingly, there is a need to protect users from electronic fraud.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
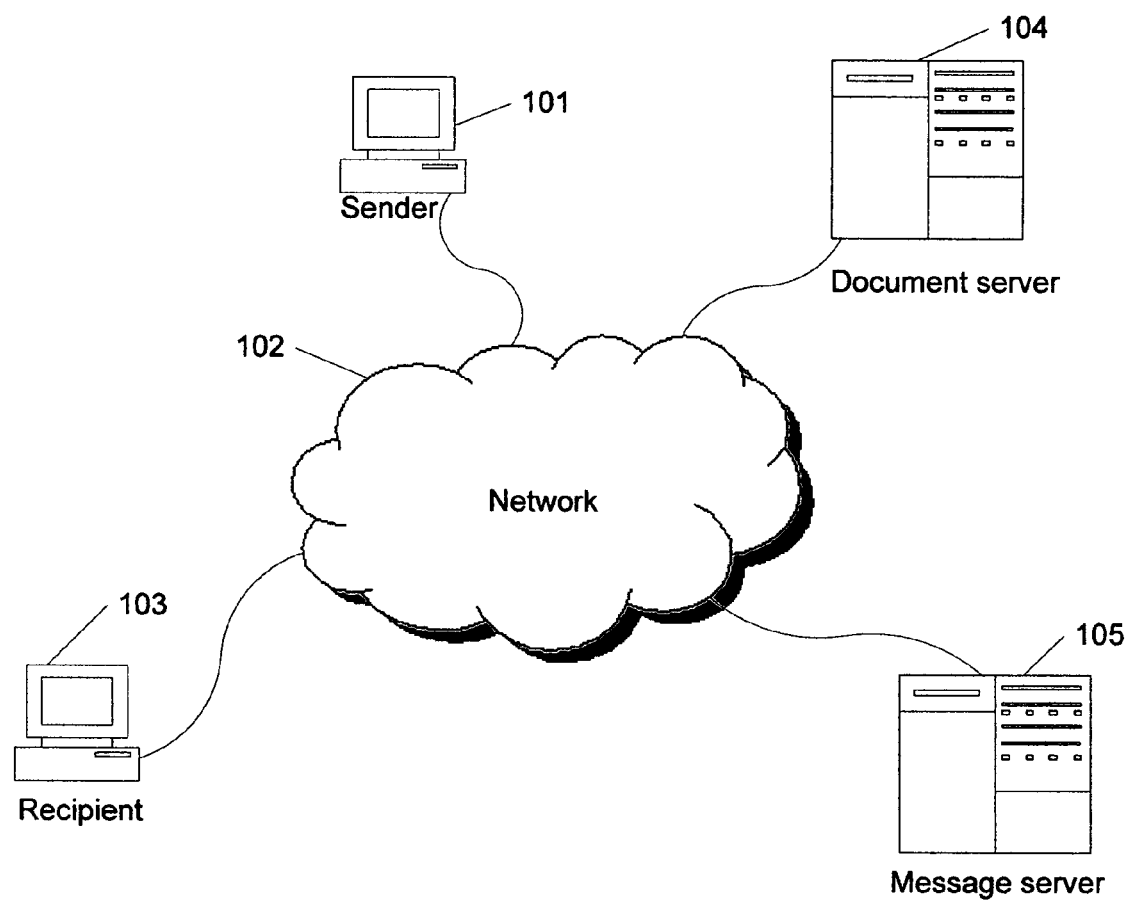
FIG. 1 is a diagram of a system for protecting a document element, according to some embodiments.

FIG. 1 is a diagram of a system for protecting a document element, according to some embodiments. In this example, a sender of a message 101 is connected to a network 102. A sender may be any device capable of sending a message, including a personal computer, PDA, or a cell phone. A sender 101 may also be a server such as a mail server receiving a message from a sender device. A message refers herein to any electronic communication that may be addressed to a user, or that may be automatically delivered to a user as a result of a subscription. Examples of a message include email, an instant message, an SMS text message, an RSS message, an Atom message, a message including streaming video, and a Bluetooth message. A sender 101 may send a message through the network 102 to a recipient 103.

The network 102 may be any type of network, for example a public network such as the internet or a cellular phone network. In another example, the network 102 may be an enterprise or home network, a virtual private network, or a wireless network such as an 802.11 or Bluetooth network. In some embodiments, the network 102 may include more than one network. An example of a network 102 including more than one network is a local area network connected to a public network such as the internet. A recipient 103 of a message may be connected to the network 102. A recipient may be any device capable of receiving a message, including a personal computer, PDA, or cell phone.

A document server 104 may be connected to the network 102. The document server 104 may be any entity capable of providing a document, such as a web server that provides a document through a protocol such as HTTP. A document refers herein to any discretely addressable unit of data, including a message, a file on a computer filesystem, a web page, and dynamically generated data provided by a server such as an HTTP server.

A message server 105, such as a Mail Transfer Agent (MTA) or POP or IMAP server, may be connected to the network 102. The message server 105 may provide a message to the recipient 103. In some embodiments, a message server 105 and recipient 103 may be within an enterprise network such as a LAN or virtual private network.

Software at recipient 103 may protect a document, or a portion of a document. Examples of a document include a message received from the sender 101, a document server 104, or a message server 105. In some embodiments, a document may contain elements that may be modified, for example by a script such as a Javascript contained within the document, or externally addressing the document. In some embodiments, a portion of a document may be protected by a document reader on a document recipient 103. A document reader refers herein to an application that displays a document and enables interaction with a document element within the document. Examples of document readers include a web browser and a messaging client, such as an email client, instant messaging client, and RSS client. Examples of protecting a portion of a document are discussed in conjunction with the remaining figures, and include preventing an unauthorized element to the document element and processing an action associated with a modified document element prejudicially.

Figure 2:
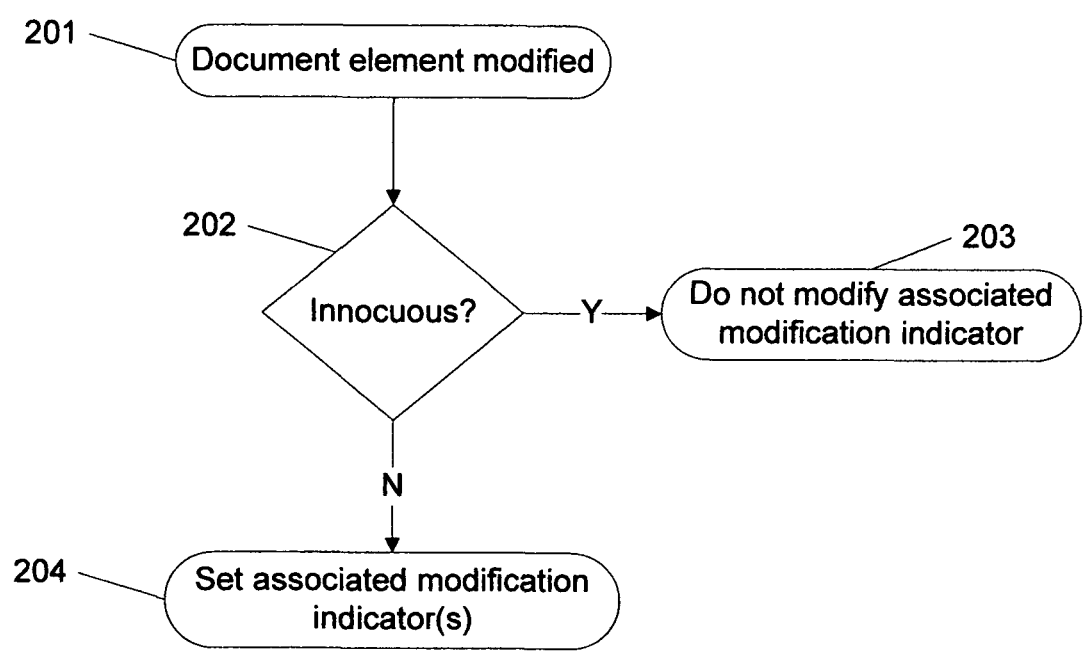
FIG. 2 is a flow diagram of a method for updating a modification indicator associated with a modified element of a document, according to some embodiments.

FIG. 2 is a flow diagram of a method for updating a modification indicator associated with a modified element of a document, according to some embodiments. An element of a document refers herein to any accessible part of a document, for example an element of a Document Object Model (DOM) as specified by the W3C Document Object Model Level 1 Specification and its predecessors and successors, specifications of which are currently available over the internet from the World Wide Web Consortium. In some embodiments, the method of FIG. 2 may be performed by a document reader.

In this example, a document element, such as a DOM element, is modified (201). Modification may, for example, be performed by an action specified in a script, such as a Javascript script. In some embodiments, modification may include creation of a new document element after the initial creation of a document object model for a document has been performed, for example when a DOM element is created by a script such as a Javascript script. Optionally, an evaluation may be made to determine whether a modification was innocuous (202). For example, it may be considered innocuous to add a username and/or password to a URL that has not been otherwise changed. A URL refers herein to any address under any scheme that permits a user to access a document via an address. One example of a URL is a Universal Record Locator as defined in IETF RFC 1738 and/or 2396 and any successors and predecessors. IETF RFC 1738 and 2396 are currently available over the internet from the Internet Engineering Task Force, and are herein incorporated by reference for all purposes.

If the change is determined to be innocuous (202), then a modification indicator associated with the document element is not modified in this example (203). A modification indicator refers herein to any indication that a document element has been modified since an initial state such as creation of the element, creation of an associated document model, or initial rendering of the element or of the document. One example of a modification indicator is a "dirty bit" variable associated with a document element. In some embodiments, a dirty bit may be created and initialized, for example by setting to zero, at an initial state. Another example of a modification indicator is a flag associated with a document element that is present only if the element has been modified since an initial state. Another example of a modification indicator is a timestamp associated with the document element, which may for example contain the time a modification occurred, for example the time the last modification occurred. In some embodiments, a timestamp associated with a document element may be initialized to the current time when a document element is created. One example of a current time is an absolute time, for example the time of the current day. Another example of a current time is an initial time, for example an initial value (such as zero) when a timer is started. In some embodiments, a timestamp associated with a portion of a document containing the document element, such as an entire document or a dominating document element, may be initialized at the time a document model is constructed, or at the time the document is opened. Another example of a modification indicator is a modification sequence number, which may for example be initialized to an initial value such as zero, and incremented each time another element is created and/or modified. Another example of a modification indicator is a codebase source, which refers herein to an indication of an entity, such as an HTML document, rendering engine component or script, that last modified an associated element.

If the change is not determined to be innocuous (202), then one or more associated modification indicators are set in this example (204). One example of setting a modification indicator is setting it to a value indicating a change has occurred, such as 1. Another example of setting a modification indicator is to create a modification indicator and associate it with a changed element. In some embodiments, if a modification indicator is already associated with a document element, no additional processing is performed to set the indicator.

In some embodiments, a single modification indicator associated with a document element may be set. In some embodiments, multiple modification indicators may be set as the result of a modification. In one example of setting multiple document indicators, in a hierarchical document model such as a DOM, when a document element is modified (201) that is not innocuous (202), modification indicators associated with the modified document element and document elements it dominates are set in this example (204). Domination refers herein to being an ancestor of a node in a hierarchy. As an example of determining domination, the elements that a node dominates may be determined by performing a traversal, for example a depth-first or breadth-first traversal, of a subtree of a document rooted at the modified element. Performing a traversal is readily understood by those skilled in the art, and is described, for example, in Aho, Hoperoft and Ullman, Data Structures and Algorithms (ISBN 0-201-00023-7), p. 78ff. In another example of setting multiple document indicators, when an element within an enclosing element such as a form is modified, other elements within the enclosing element may also be set. For example, when contents of a form are changed, a modification indicator may be set associated with the entire form, or an element within the form, such as en element relating to submitting the form.

Figure 3:
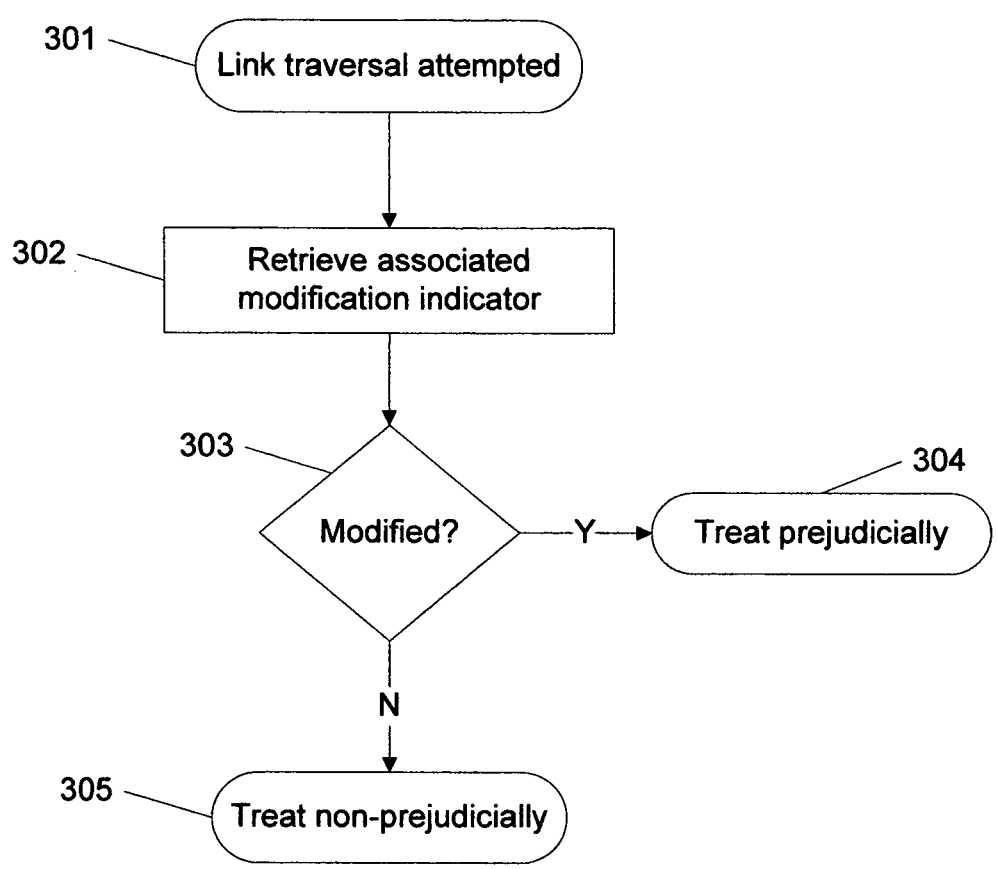
FIG. 3 is a flow diagram of a method for prejudicial treatment of a document element that has been modified, according to some embodiments.

FIG. 3 is a flow diagram of a method for prejudicial treatment of a document element that has been modified, according to some embodiments. In some embodiments, the method of FIG. 3 may be performed by a document reader. In this example, a link traversal is attempted (301), for example because a user has clicked on a link in a web page, or attempted to submit a form. A link refers herein to an element of a document with an associated URL, for example an element of an HTML document associated with a URL using an '<A HREF="...">', '<INPUT TYPE="submit">' or '<IMG SRC="...">' tag. Traversing a link refers herein to retrieving a document referred to by a URL associated with the link. An associated modification indicator is retrieved in this example, if present (302). This modification indicator may, for example, be created and/or modified as discussed in conjunction with FIG. 2.

It may be determined whether an associated modification indicator indicates that the document element has been modified since an initial state (303). One example of determining whether the document element has been modified is to determine whether a modification indicator is associated with the element. Another example of determining whether the document element has been modified is to check a value of a modification indicator associated with the element and determine whether it is set. For example, a modification indicator may be considered set if it has the value 1. Another example of determining whether the document element has been modified is to compare a modification timestamp associated with the document element with a creation time. A creation time may, for example, be associated with the document element, or with a portion of the document containing the document element, such as the entire document, or a dominating document element. In some embodiments, a modification may be considered to have been made if more than a predetermined period of time, such as five seconds, elapsed between creation of the document or document element and a modification of the document element. In some embodiments, a modification may be considered to have been made if another element, such as a link within an enclosing element such as a table that also contains the document element, has been modified more recently than the document element. One example of detecting whether one document element has been modified more recently than another is to compare timestamps associated with the document elements. Another example of detecting whether one document element has been modified more recently than another is to compare modification sequence numbers associated with the document elements. Another example of determining whether the document element has been modified, in a hierarchical document model such as a DOM, is to check one or more values of modification indicators associated with one or more dominating elements.

If it is determined that the document element has been modified (303), then the link traversal is treated prejudicially in this example (304). Examples of prejudicial treatment for a modified document element include disallowing a link traversal, and presenting a user interface element, permitting the user to traverse the link or not, prior to possibly traversing the link. If the modification indicator is not set, for example if it has the value 0 or does not exist, then the link traversal is treated non-prejudicially in this example (305), for example as specified in security settings for the application being used.

Figure 4:
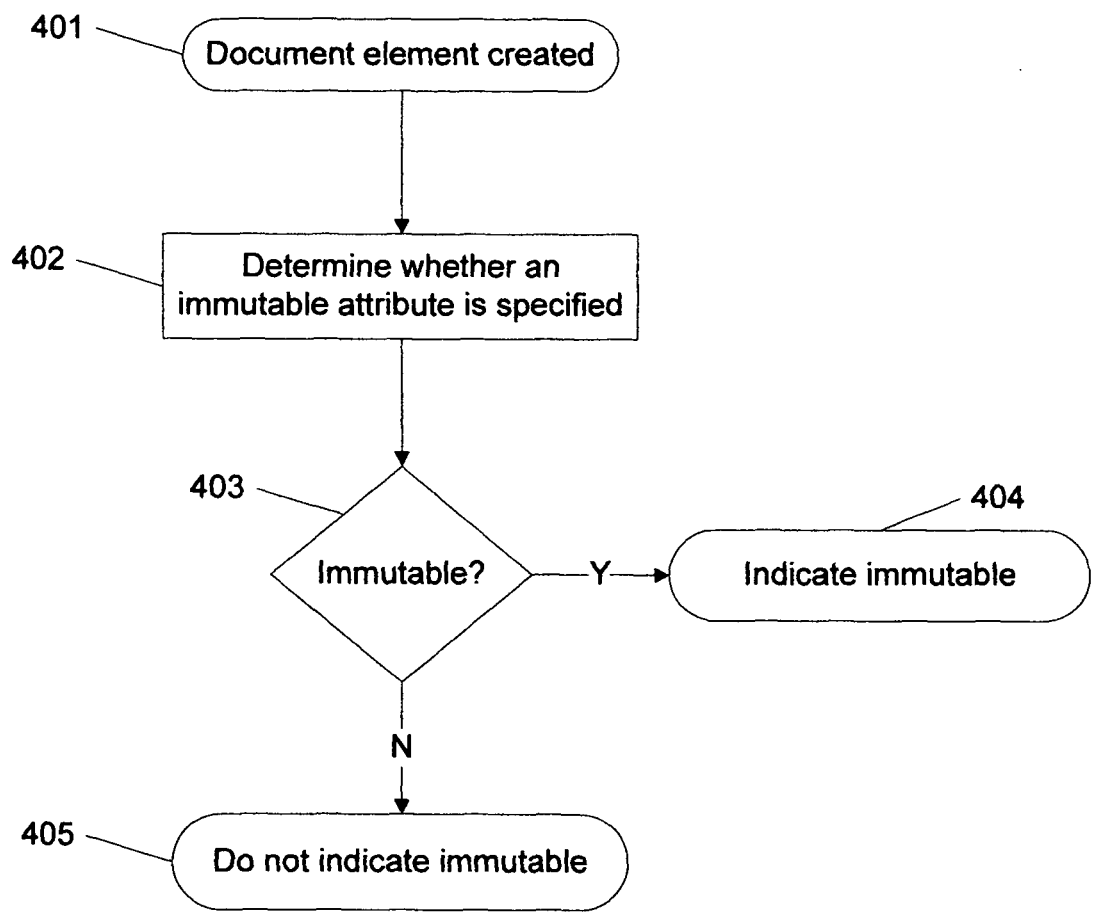
FIG. 4 is a flow diagram of a method for creating an immutable document element, according to some embodiments.

FIG. 4 is a flow diagram of a method for creating an immutable document element, according to some embodiments. In some embodiments, the method of FIG. 4 may be performed by a document reader. In this example, a document element such as a DOM element is created (401). An example of a circumstance under which a document element may be created is when a document specification such as an HTML specification is parsed and a document model is constructed. It may be determined whether an attribute specifying that the document element is immutable is specified (402). An example of an attribute specifying that the document element is immutable is an attribute contained in an HTML tag that indicates that the element associated with the attribute should be immutable. For example, a link of the form <A HREF="xxx"IMMUTABLE> could specify that the element formed by the <A> tag should be immutable. Another example of determining whether an attribute specifies that the document element is immutable is to determine whether a dominating element is immutable.

If it is determined that there is an attribute specifying that the document element is immutable (403), then it is indicated that the document element is immutable in this example (404). An example of indicating that a document element is immutable is to create an immutability indicator and associate it with the document element. Another example of indicating that a document element is immutable is to set an associated immutability indicator, for example by setting its associated value to 1. If it is determined that there is no attribute specifying that the document element is immutable (403), then it is not indicated that the document element is immutable in this example (405). An example of not indicating that a document element is immutable is to leave the document element with no associated immutability indicator. Another example of not indicating that a document element is immutable is to clear an associated immutability indicator, for example by setting its associated value to 0. In some embodiments, an immutability indicator may be automatically set after an external event. One example of an external event is the passage of a predetermined amount of time since the element was created, such as 5 seconds. Another example of an external event is issuance of a predetermined number of additional modification sequence numbers, such as 100. Another example of an external event is the creation of another element of a related element type, for example a link.

Figure 5:
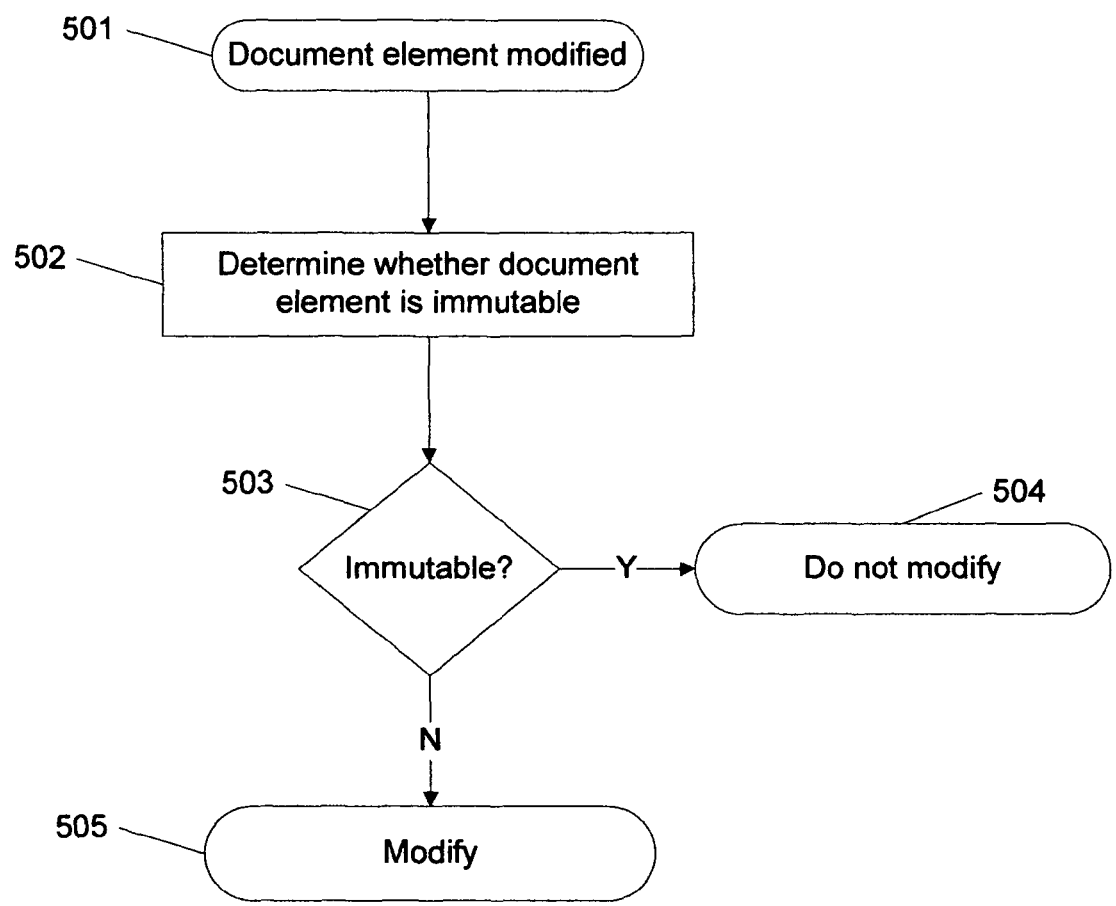
FIG. 5 is a flow diagram of a method for preventing an immutable document element from being modified, according to some embodiments.

FIG. 5 is a flow diagram of a method for preventing an immutable document element from being modified, according to some embodiments. In some embodiments, the method of FIG. 5 may be performed by a document reader. In this example, an attempt is made to modify a document element such as a DOM element (501). An example of an attempt to modify a document element is a modification requested by a script such as a Javascript script in an HTML document. It may be determined whether the document element is immutable (502). In some embodiments, a document element may have been marked as immutable or not immutable as discussed in conjunction with FIG. 4. An example of determining whether a document element is immutable is to determine whether an immutability indicator is associated with the document element. Another example of determining whether a document element is immutable is to determine whether an associated immutability indicator is set, for example whether it has the value 1. Another example of determining whether a document element is immutable is to determine if an external event implying immutability, such as those discussed in conjunction with FIG. 4, have taken place. Another example of determining whether a document element is immutable is to determine whether a codebase source associated with the document element is compatible with an entity attempting to modify the element. For example, after the creation or first modification of a document element, the document element may be considered immutable when an entity attempting to modify the document element does not match a codebase source associated with the document element.

If it is determined that the document element is immutable (503), then the document element is not modified in this example (504). If it is determined that the document element is not immutable (503), then the document element is modified in this example (505).

Figure 6:
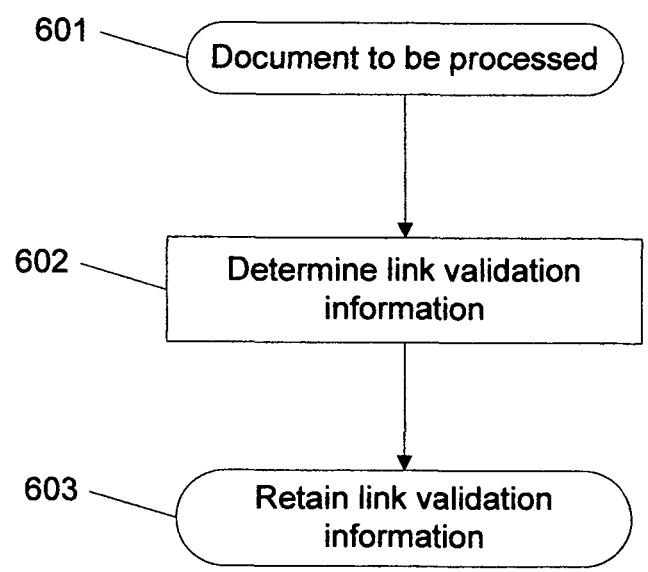
FIG. 6 is a flow diagram of a method for determining link validation information, according to some embodiments.

FIG. 6 is a flow diagram of a method for determining link validation information, according to some embodiments. In some embodiments, the method of FIG. 6 may be performed by a document reader. In this example, a document is to be processed (601). An example of a reason a document may be processed is that it is being parsed, for example to create a document model. Link validation information may be determined (602). An example of determining link validation information is to determine one or more specifications of allowed links. An example of a specification of allowed links is a specification of a form such as the following, contained within an HTML document, for example within the head of the HTML document:

<LINK> *.ebay.com/* </LINK>
    <LINK> www.squaretrade.com </LINK>

In this example, a specification of allowable links contains one or more individual link specifications. An individual link specification, between the delimiters <LINK> and </LINK>, contains either a specification of an individual link address that may be allowed, such as www.squaretrade.com, or a specification that may match multiple links. In this example, the individual link specification "*.ebay.com/*" may match any link address matching the regular expression "*.ebay.com/*," which may for example be interpreted as any string of alphanumeric characters, followed by ".ebay.com/," followed by any string of alphanumeric characters.

In some embodiments, link specifications may be permitted only in a predetermined portion of a document, such as the head of an HTML document. In some embodiments, a tag may inhibit processing of additional link specifications. For example, there may be an attribute included in a link specification, such as <LINK FINAL>. In that example, any link specifications pair after that "FINAL" link specification pair may be ignored. An example of ignoring a link specification pair is to not retain the link validation information associated with the pair. In some embodiments, a key may be specified and only additional link specifications containing that key will be retained. For example, a key attribute of a link specification pair may my provided as <LINK KEY=ab549ff90> and </LINK>. In that example, any link specification pairs that fail to provide a designated key may be ignored.

Another example of link validation information is a key that may be used to verify cryptographic information associated with one or more links in the document.

If link validation information is determined to be present (602), then the link validation may be retained in this example (603). An example of retaining the link validation information is to associate it in memory with the document.

Figure 7:
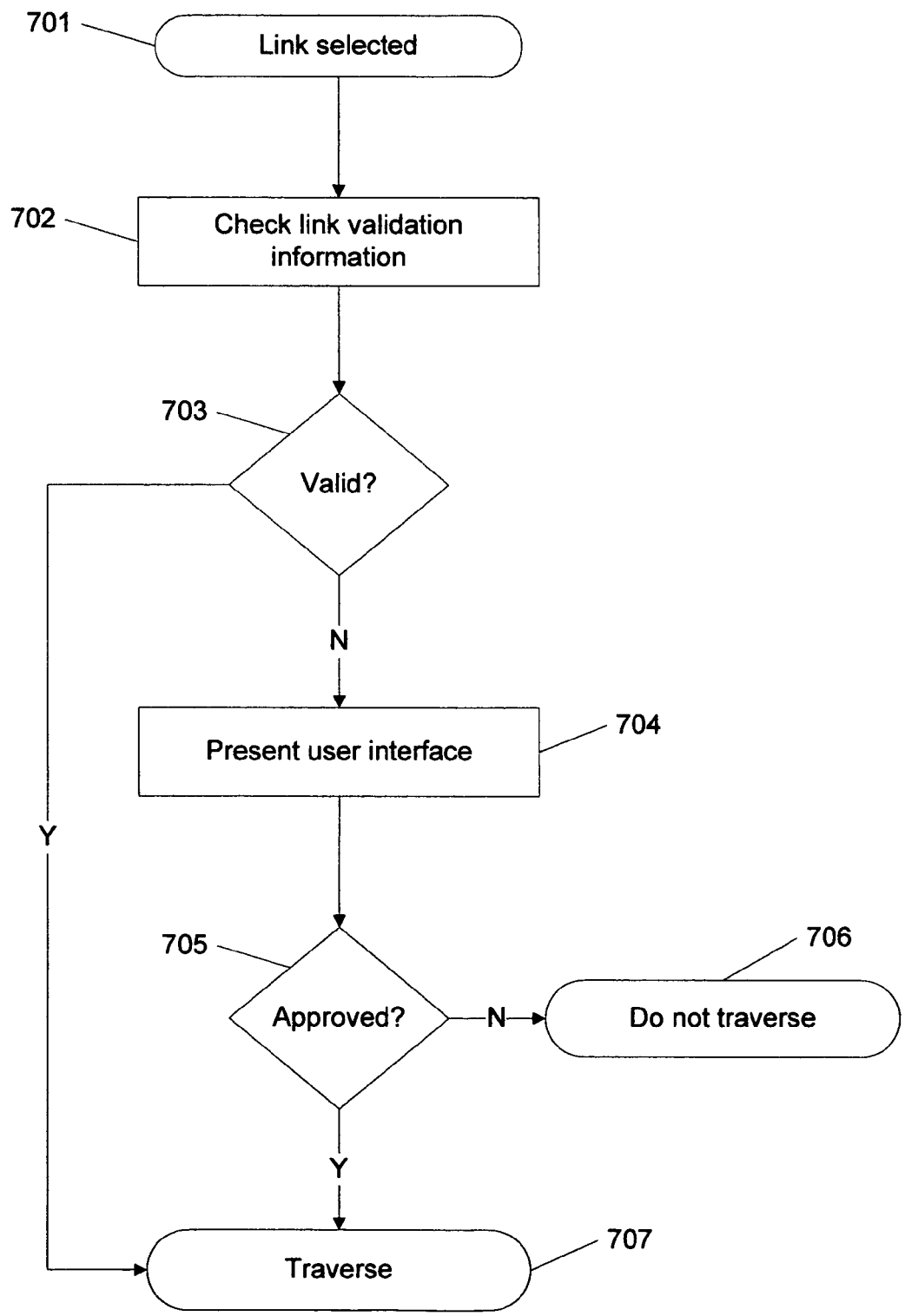
FIG. 7 is a flow diagram of a method for validating a link, according to some embodiments.

FIG. 7 is a flow diagram of a method for validating a link, according to some embodiments. In some embodiments, the method of FIG. 7 may be performed by a document reader. In this example, a link is selected (701). An example of a way a link may be selected is that a user may have clicked on the link. Link validation information may be checked (702). An example of checking link validation information is to determine a URL associated with the link and compare the URL against link validation information retained as discussed in conjunction with 603 of FIG. 6. One example of comparing a URL against link validation information is to determine whether the URL is contained in, or matches a pattern specified in, the link validation information. Another example of comparing a URL against link validation information is to determine whether the URL, or associated link, is validly signed using a key associated with the link validation information. For example, a link in an HTML document may be of a form such as <A HREF="xxx" SIGNATURE="yyy">, wherein xxx refers to a URL and yyy refers to a cryptographic signature that may be verified using a key specified in the link validation information. An example of verifying a cryptographic signature on a link using a key is to perform a hash on a combination of the link and the key and determine whether the result matches the signature information. In some embodiments, the entire link may be validated. In some embodiments, a component of the link, such as a URL associated with the link, may be validated. Another example of comparing a URL against link validation information is to determine that no link validation information is present. In some embodiments, lack of link validation information associated with a document may indicate that a link in the document is valid.

If it is determined that the link is valid (703), then the link is traversed in this example (707). An example of traversing a link is to retrieve a document referred to by a URL associated with the link. If it is determined that the link is not valid (703), then an optional user interface element such as a dialog box is presented in this example (704). In some embodiments, the user interface element may offer options to approve or deny a specified link traversal. If the user opts to approve the link traversal (705), then the link is traversed in this example (707). If the user opts not to approve the link traversal (705), or if no user interface element is presented, then the link is not traversed in this example (706).

An illustrative example of the techniques in the foregoing figures is provided with reference to a script, such as a Javascript script, contained within externally provided document content, such as an eBay listing, that modifies a link within the document, such as an eBay link, to point to a fraudulent site that asks the user for confidential information such as his or her eBay login information. In some embodiments, the technique of FIG. 2, for example operating within a document reader such as a web browser, may detect the modification and indicate that the element has been modified, enabling the technique of FIG. 3 to prevent a traversal, or provide a warning that the traversal is unsafe. In some embodiments, the technique of FIG. 4 may enable a web site provider such as eBay to mark the link immutable, which may be enforced, for example within a document reader such as a web browser, by the technique of FIG. 5. In some embodiments, authorized links may be specified by a web site provider using a technique of FIG. 6, and a technique of FIG. 7, for example within a document reader, may prevent an unauthorized link from being created.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for computer security, comprising:
    displaying, by a programmable computing device executing instructions, an electronic document;
    detecting, by the computing device, a request to traverse a link, wherein the link is associated with an element of the document;
    evaluating, by the computing device, an attribute, wherein the attribute is associated with the element of the document and wherein evaluating the attribute includes determining whether a destination associated with the link was enumerated; and
    determining, by the computing device, whether to traverse the link based on the evaluation.

2. The method of claim 1, wherein the document is an HTML document.

3. The method of claim 1, wherein the element of the document is associated with a document object model.

4. The method of claim 1, wherein determining, by the computing device, whether the destination was enumerated includes determining, by the computing device, whether the destination was enumerated in a predetermined section, wherein the section is associated with the document.

5. The method of claim 4, wherein the document is an HTML document and the section is a head section associated with the document.

6. The method of claim 1, wherein the link is associated with submitting a form.

7. A system for computer security, comprising:
    a processor;
    a memory coupled to the processor;
    the memory storing instructions which when executed by the processor cause the processor to execute the steps of:
    displaying an electronic document;

detecting a request to traverse a link, wherein the link is associated with an element of the document;

evaluating an attribute, wherein the attribute is associated with the element of the document and wherein evaluating the attribute includes determining whether a destination associated with the link was enumerated; and determining whether to traverse the link based on the evaluation.

8. A non-transitory computer readable medium storing computer instructions which when executed by a processor cause the processor to perform the steps of:

displaying an electronic document;

detecting a request to traverse a link, wherein the link is associated with an element of the document;

evaluating an attribute, wherein the attribute is associated with the element of the document and wherein evaluating the attribute includes determining whether a destination associated with the link was enumerated; and determining whether to traverse the link based on the evaluation.

9. The method of claim 1, wherein the enumeration includes a wildcard.

10. The system of claim 7, wherein the link is associated with submitting a form.

11. The computer program product of claim 8, wherein the link is associated with submitting a form.

12. The system of claim 7, wherein the document is an HTML document.

13. The system of claim 7, wherein determining whether the destination was enumerated includes determining whether the destination was enumerated in a predetermined section, wherein the section is associated with the document.

14. The system of claim 13, wherein the document is an HTML document and the section is a head section associated with the document.

15. The system of claim 7, wherein the enumeration includes a wildcard.

16. The non-transitory computer readable medium of claim 8, wherein the document is an HTML document.

17. The non-transitory computer readable medium of claim 8, wherein determining whether the destination was enumerated includes determining whether the destination was enumerated in a predetermined section, wherein the section is associated with the document.

18. The non-transitory computer readable medium of claim 17, wherein the document is an HTML document and the section is a head section associated with the document.

19. The non-transitory computer readable medium of claim 8, wherein the enumeration includes a wildcard.

\* \* \* \* \*